Apr. 3, 1923.

J. W. BOND.
BRACE FOR RADIUS RODS.
FILED JUNE 7, 1922.

1,450,426.

Inventor
James W. Bond
by his Attorneys
Baldwin Wight

Patented Apr. 3, 1923.

1,450,426

UNITED STATES PATENT OFFICE.

JAMES W. BOND, OF COLUMBIA, SOUTH CAROLINA, ASSIGNOR OF ONE-HALF TO WILLIAM J. TAYLOR, OF COLUMBIA, SOUTH CAROLINA.

BRACE FOR RADIUS RODS.

Application filed June 7, 1922. Serial No. 566,635.

*To all whom it may concern:*

Be it known that I, JAMES W. BOND, a citizen of the United States, residing at Columbia, in the county of Richland and State of South Carolina, have invented certain new and useful Improvements in Braces for Radius Rods, of which the following is a specification.

This invention relates to the running gear of vehicles and especially to that type of running gear employed on the Ford motor car and similar motor cars, in which the front axle is supported and stabilized by what are called "radius rods" which extend from the front axle rearwardly to a common center in the rear portion of the frame. In the usual construction, the front ends of the radius rods are secured to the axle by bolts and nuts which commonly work loose in practice, causing the frame to be weakened and producing considerable noise. It is the object of my invention to overcome these objections and this I do by providing braces of improved construction which are applied to the upper portion of the axle and extend therefrom rearwardly and downwardly to the radius rods to which they are firmly connected. The construction is such that the radius rods are firmly braced, and should the clamping devices work loose the rods will still be supported or prevented from dropping to the ground.

In the accompanying drawings:—

Figure 1:
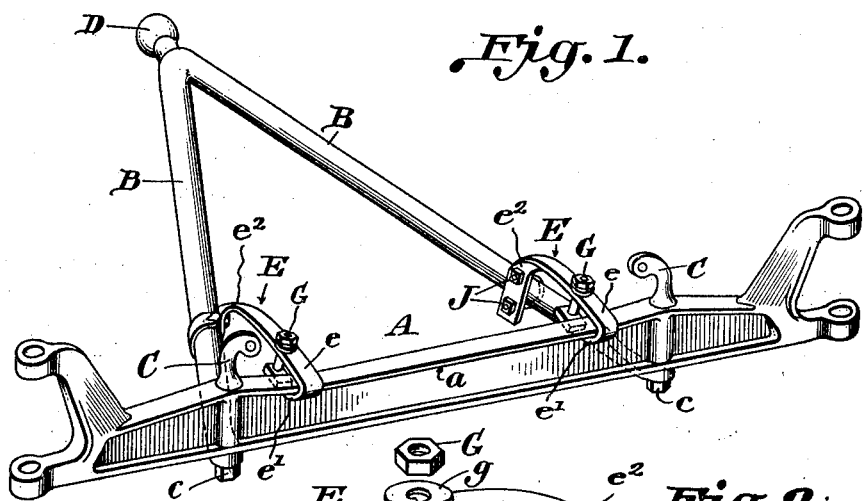
Figure 1 is a perspective view of the front axle of a motor car having radius rods applied thereto and braced in accordance with my invention.
Figure 2:
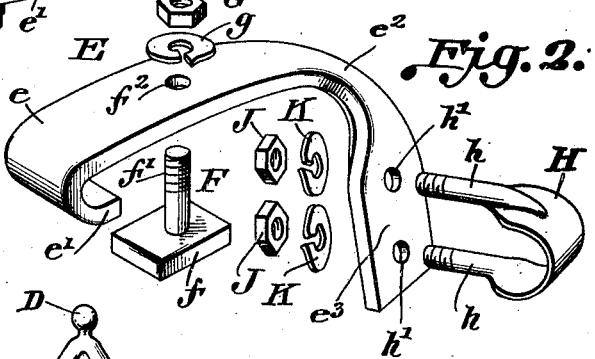
Figure 2 is a perspective view of one of the braces and the fastening devices associated therewith.
Figure 3:
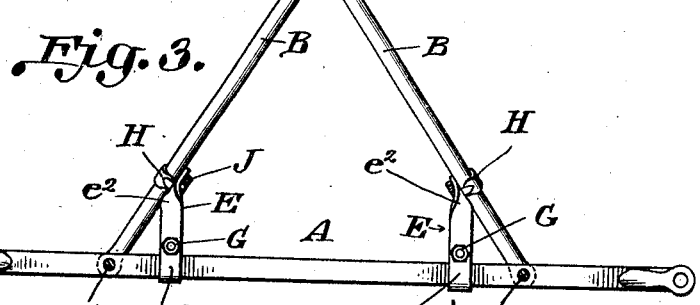
Figure 3 is a plan view of the parts shown in Figure 1.

The axle A shown in the drawings is of the usual kind used in Ford cars and similar vehicles. The radius rods B are connected with the axle by bolts C which extend vertically through the axle and through the front ends of the rod, the latter being held in place by nuts $c$ applied to the lower ends of the bolts. The bolts C extend somewhat above the top of the axle and are properly formed to support a spring above the axle in the usual way.

The radius rods converge and may be connected at D to a suitable part of the frame.

In order to strengthen the structure, I provide the improved braces E which extend from the top of the front axle between the front ends of the radius rods to the front portions of the rods which are arranged below the top of the front axle.

Each brace E is made of a single piece of metal having a front part $e$ adapted to extend over the top of the axle and formed with a lip $e'$ adapted to engage the flange $a$ of the axle which is I-shape in cross section. The brace is bent or twisted at $e^2$ and formed with a flat portion $e^3$ adapted to lie against the inner side of the associated brace rod. It will be observed that the brace extends from the top of the axle rearwardly and downwardly to its connection with the radius rod.

In order to fasten the brace to the axle I employ a bolt F having a large head $f$ and a threaded shank $f'$ which extends through a hole $f^2$ in the front portion of the brace and receives a nut G and a spring locking washer $g$. The head $f$ of the bolt engages a flange on the rear side of the axle and when the nut is screwed home, the front portion of the brace is firmly connected with the axle.

The rear part of the brace is associated with a clevis H, the threaded stems $h$ of which extend through holes $h'$ in the part $e^3$ of the brace and receive nuts J and spring locking washers K.

When the nuts J and washers K are applied and the nuts are screwed home, the rear portion of the brace is firmly fastened to the radius rod. The braces are made in pairs, that is, rights and lefts, permitting them to be properly applied in the manner shown. While I have shown my improvements applied to a front axle and to an axle commonly used on Ford cars, it will be understood that they may be applied to axles of other kinds.

When the braces are applied to the axle and to the radius rods in the manner shown, the parts are firmly connected. Should the nuts loosen or drop off, the braces will still prevent the front ends of the radius rods from dropping to the ground and there is no danger of the braces being entirely separated from the axles and the rods.

I claim as my invention:—

1. The combination with an axle, of converging radius rods, means for connecting the ends of the rods with the axle, and braces for said radius rods, each brace comprising a front portion clamped to the upper side of the axle inside of the point of connection of the radius rod therewith and a portion extending rearwardly and downwardly to the associated radius rod, and means for clamping said portion to the radius rod.

2. The combination with an axle, of converging radius rods, means for connecting the rods with the axle, and braces for the rods each comprising a front portion having a lip engaging the axle, a middle portion bent or twisted and extended downwardly from the top of the axle to an associated radius rod, a bolt connecting the front portion of the brace with the axle, and a clevis connecting the rear portion of the brace with the associated radius rod.

3. The combination with an axle, I-shaped in cross-section, of converging radius rods connected to the bottom of the axle and braces for the rods each comprising a front portion formed with a lip engaging the top flange of the axle, a bent middle portion extending downwardly and rearwardly from the top of the axle, and a rear portion adapted to engage a rod, a bolt applied to the front portion of the brace and engaging the top flange of the axle, and a clevis connecting the associated rod with the rear portion of the brace.

In testimony whereof, I have hereunto subscribed my name.

JAMES W. BOND.